(12) United States Patent
Niki

(10) Patent No.: US 6,615,647 B2
(45) Date of Patent: Sep. 9, 2003

(54) FAILURE DETECTION APPARATUS FOR COOLING SYSTEM OF INTERNAL COMBUSTION ENGINE

(75) Inventor: Manabu Niki, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/876,000

(22) Filed: Jun. 6, 2001

(65) Prior Publication Data

US 2001/0050063 A1 Dec. 13, 2001

(30) Foreign Application Priority Data

Jun. 7, 2000 (JP) .......................... 2000-169904

(51) Int. Cl.$^7$ .................. G01M 15/00; G01M 19/00
(52) U.S. Cl. ........................ 73/118.1; 73/116
(58) Field of Search .................. 73/118.1, 118.2, 73/116; 123/41.15, 41.12, 41.1

(56) References Cited

U.S. PATENT DOCUMENTS 6,200,021 B1 * 3/2001 Mitsutani et al. ............. 374/1
6,230,553 B1 * 5/2001 Uchiyama et al. .......... 73/118.1
2001/0005807 A1 * 6/2001 Kitajima et al. ............. 701/112

FOREIGN PATENT DOCUMENTS

JP              2000-8853           1/2000

* cited by examiner

Primary Examiner—Edward Lefkowitz
Assistant Examiner—Takisha S Miller
(74) Attorney, Agent, or Firm—Lahive & Cockfield, LLP

(57) ABSTRACT

A failure detection apparatus for a cooling system of an internal combustion engine is disclosed. The cooling system has a radiator, a cooling water pipe for circulating a cooling water in the engine to the radiator, and a thermostat provided in the cooling water pipe for opening and closing the cooling water pipe. An estimated cooling water temperature of the engine is calculated according to the engine operating condition. The estimated cooling water temperature is compared with a determination threshold set according to the detected vehicle speed at the time the detected cooling water temperature has exceeded a predetermined water temperature. If the estimated cooling water temperature is lower than or equal to the determination threshold, it is determined that the thermostat is normal.

33 Claims, 11 Drawing Sheets

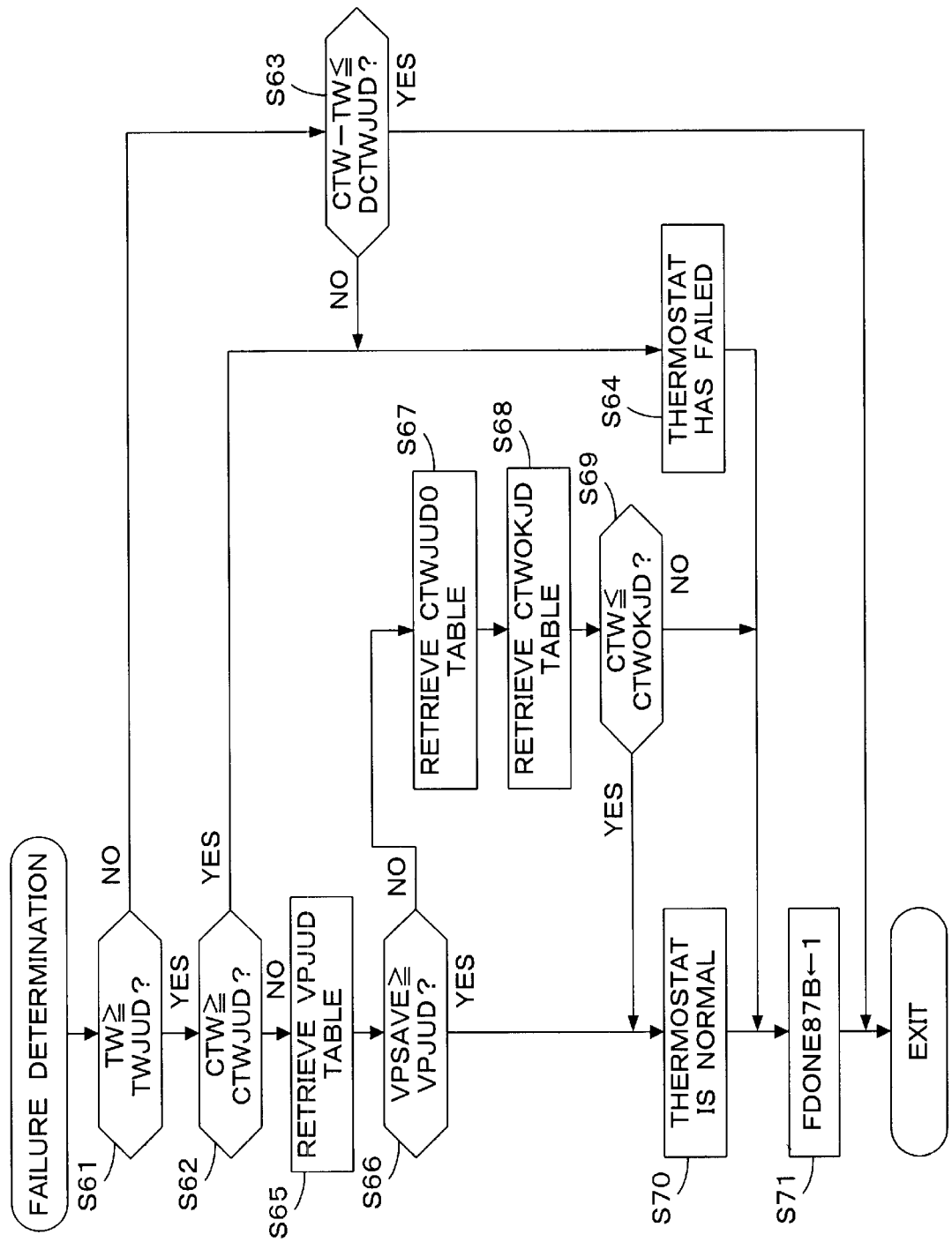

FAILURE DETECTION APPARATUS FOR COOLING SYSTEM OF INTERNAL COMBUSTION ENGINE

RELATED APPLICATION

This application claims the benefit of priority under 35 U.S.C. 119 to Japanese Application Serial No. 2000-169904, filed Jun. 7, 2000. The Japanese Serial No. 2000-169904 names the same inventor as this application: U.S. Ser. No.09/876,000, FAILURE DETECTION APPARATUS FOR COOLING SYSTEM OF INTERNAL COMBUSTION ENGINE.

BACKGROUND OF THE INVENTION

The present invention relates to a failure detection apparatus for a cooling system of an internal combustion engine, for detecting failure of a thermostat provided in the cooling system for the internal combustion engine.

In general, a cooling system for a water-cooled internal combustion engine for a vehicle includes a radiator for lowering the temperature of cooling water, a cooling water pipe for circulating the cooling water between the engine and the radiator, and a thermostat (temperature-sensitive switch valve) for opening and closing the cooling water pipe. The thermostat operates as follows: when the cooling water temperature is low, e.g. at starting of the engine, the thermostat closes the cooling water pipe to thereby accelerate the rise in temperature of the engine, and when the cooling water temperature becomes high, the thermostat opens the cooling water pipe to circulate the cooling water from the engine to the radiator to thereby allow the cooling water to be cooled in the radiator.

A method of detecting failure of the thermostat is disclosed in Japanese Patent Laid-open No. 2000-8853, for example. According to the method disclosed in this publication, an estimated value CTW of a cooling water temperature (which value will be hereinafter referred to as "estimated water temperature") is calculated according to a temperature condition at starting of the engine and engine operating conditions after starting of the engine. In the case that an actual cooling water temperature TW does not reach a normality determination value at the time the estimated water temperature CTW has reached a failure determination value, it is determined that the thermostat has failed (the thermostat has not properly closed). On the other hand, in the case that an averaged vehicle speed is higher than or equal to a predetermined value VPSAVTRM at the time the actual cooling water temperature TW reaches the normality determination value before the estimated water temperature CTW has reached the failure determination value, it is determined that the thermostat is normal. Further, if the averaged vehicle speed is lower than the predetermined value VPSAVTRM at the time the actual cooling water temperature TW reaches the normality determination value, a radiator fan is forcibly operated for a predetermined time period, and the determination of whether or not the thermostat has failed is then performed according to the actual cooling water temperature TW after the operation of the radiator fan.

However, the above conventional method has a problem such that if the average of vehicle speeds is lower than the predetermined value VPSAVTRM at the time the actual cooling water temperature TW has reached the normality determination value, the determination that the thermostat is normal cannot be immediately made and the time required for this determination becomes long. Further, the radiator fan must be operated in this case, so that there is a possibility of degradation in fuel economy or degradation in heater performance due to operation of the radiator fan.

SUMMARY OF THE INVENTION

It is accordingly an object of the present invention to provide a failure detection apparatus which can perform rapid and accurate determination even when the vehicle speed is low and can prevent degradation in fuel economy and degradation in heater performance due to operation of the radiator fan.

In accordance with the present invention, there is provided a failure detection apparatus for a cooling system of an internal combustion engine. The cooling system has a radiator (21), a cooling water pipe (22) for circulating a cooling water in the engine to the radiator, and a thermostat (23) provided in the cooling water pipe for opening and closing the cooling water pipe. The failure detection apparatus detects failure of the thermostat and comprises vehicle speed detecting means (18), operating condition detecting means, estimated cooling water temperature calculating means, and determining means. The vehicle speed detecting means detects a vehicle speed (VPS) of a vehicle driven by the engine. The operating condition detecting means detects an operating condition of the engine, and includes cooling water temperature detecting means (10) for detecting a temperature (TW) of the cooling water. The estimated cooling water temperature calculating means calculates an estimated cooling water temperature (CW) of the engine according to the operating condition detected by the operating condition detecting means. The determining means compares the estimated cooling water temperature (CW) and a determination threshold (CTWOKJD) set according to the vehicle speed at the time the cooling water temperature (TW) detected by the cooling water temperature detecting means has exceeded a predetermined water temperature (TWJUD), to thereby determine that the thermostat is normal.

With this configuration, the estimated cooling water temperature (CTW) and the determination threshold (CTWOKJD) set according to the vehicle speed are compared at the time the detected cooling water temperature (TW) has exceeded the predetermined water temperature (TWJUD), to thereby determine that the thermostat is normal. Accordingly, by using the determination threshold according to the vehicle speed, it is possible to rapidly and accurately determine that the thermostat is normal even when the vehicle speed is low. As a result, it is possible to prevent a degradation in fuel economy or a degradation in heater performance due to the operation of a radiator fan.

Preferably, the determining means determines that the thermostat is normal when the estimated cooling water temperature is lower than or equal to the determination threshold.

Preferably, the determination threshold (CTWOKJD) is set to a value decreasing with a decrease in the vehicle speed.

Preferably, the cooling system failure detecting device further comprises average vehicle speed calculating means for calculating an average vehicle speed (VPSAVE) after completion of starting of the engine, wherein the determination threshold (CTWOKJU) is set according to the average vehicle speed (VPSAVE).

Preferably, the cooling system failure detecting device further comprises average vehicle speed calculating means for calculating an average vehicle speed after completion of starting of the engine, wherein the determining means determines that the thermostat is normal when the estimated cooling water temperature (CTW) is lower than a predetermined estimated water temperature (CTWJUD) higher than the predetermined water temperature (TWJUD) and the average vehicle speed (VPSAVE) is higher than or equal to a determination vehicle speed (VPJUD) at the time the detected cooling water temperature (TW) has exceeded the predetermined water temperature (TWJUD).

Preferably, the determination vehicle speed (VPJUD) is set according to an initial cooling water temperature (TWINI) at starting of the engine.

Preferably, the estimated cooling water temperature calculating means comprises thermal load parameter calculating means for calculating a thermal load parameter (TITTL) indicating a degree of raising the cooling water temperature, wherein the estimated cooling water temperature calculating means calculates the estimated cooling water temperature (CTW) according to the thermal load parameter (TITTL) and an initial cooling water temperature (TWINI, KDCTW) at starting of the engine.

Preferably, the thermal load parameter calculating means comprises generated heat quantity calculating means for calculating a generated heat quantity integrated value (TIMTTL) indicating an integrated value of a heat quantity generated from the engine after starting of the engine and cooling loss calculating means for calculating a cooling loss integrated value (CLTTL) indicating an integrated value of a heat quantity lost by a heater in the vehicle and a heat quantity lost by a wind after starting of the engine, wherein the thermal load parameter calculating means calculates the thermal load parameter (TITTL) according to the generated heat quantity integrated value (TIMTTL) and the cooling loss integrated value (CLTTL).

Preferably, the generated heat quantity calculating means calculates the generated heat quantity integrated value (TIMTTL) according to an intake air amount per unit time of the engine, and the cooling loss calculating means calculates the cooling loss integrated value (CLTTL) according to an estimated water temperature rise (DCTW) after starting of the engine and the vehicle speed.

Preferably, the cooling system failure detecting device further comprises determination permitting means for permitting determination by the determining means when the engine is started in the condition where the engine is cooled to a temperature substantially equal to an outside air temperature.

BRIEF DESCRIPTION OF THE DRAWINGS

FIG. 11 is a flowchart showing a modification of the processing shown in FIG. 8.

DETAILED DESCRIPTION OF THE PREFERRED EMBODIMENTS

A preferred embodiment of the present invention will now be described with reference to the drawings.

Figure 1:
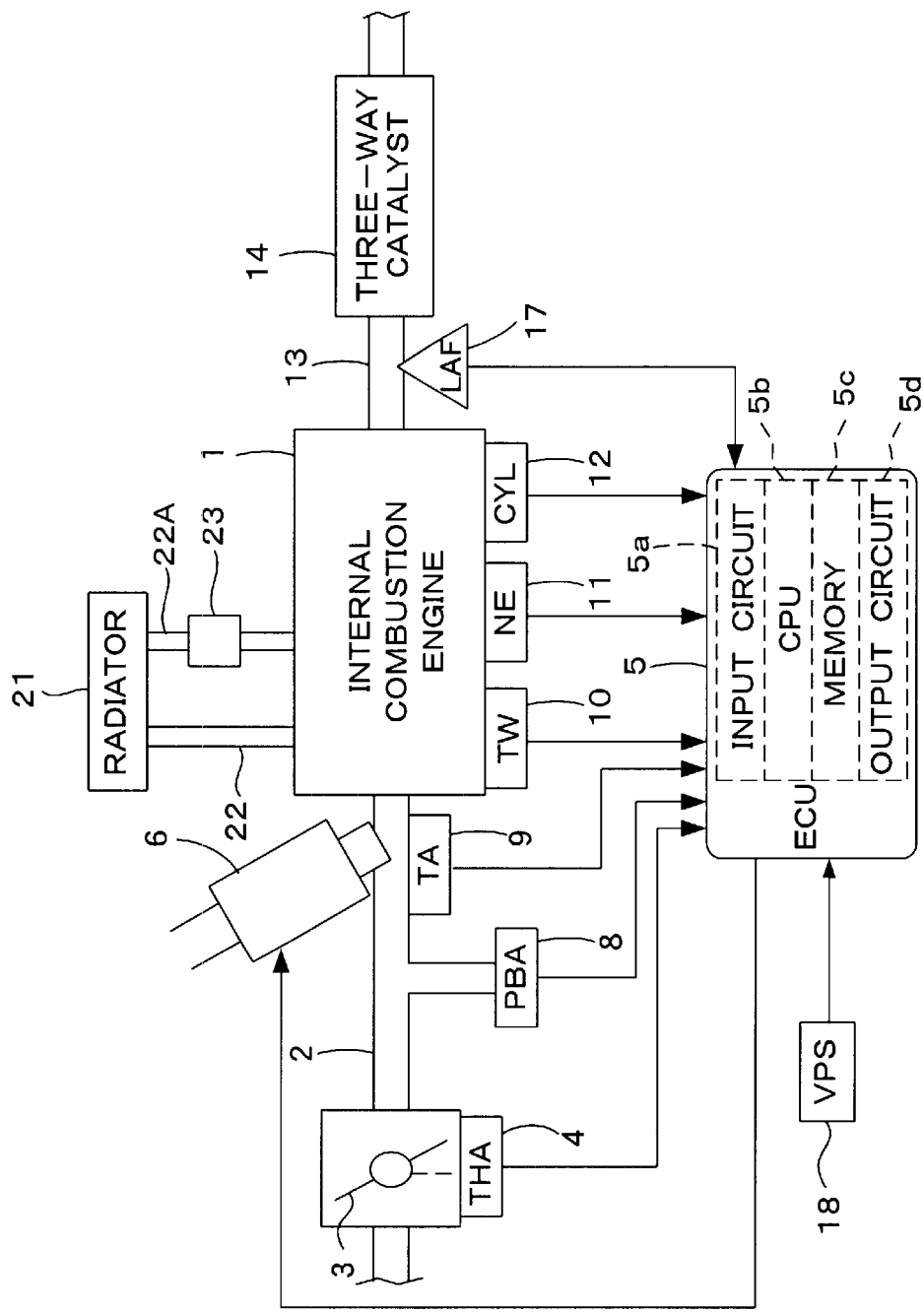
FIG. 1 is a schematic diagram showing the configuration of an internal combustion engine and a control device therefor, including a cooling system failure detecting device according to a preferred embodiment of the present invention.

Referring to FIG. 1, there is schematically shown a general configuration of an internal combustion engine (which will be hereinafter referred to as "engine") and a control system therefor, including a failure detection apparatus for a cooling system of the engine according to a preferred embodiment of the present invention. The engine 1 is a four-cylinder engine, and it has an intake pipe 2 provided with a throttle valve 3. A throttle valve opening (THA) sensor 4 is connected to the throttle valve 3. The throttle valve opening sensor 4 outputs an electrical signal corresponding to an opening angle of the throttle valve 3 and supplies the electrical signal to an electronic control unit (which will be hereinafter referred to as "ECU") 5 for controlling the engine 1.

Fuel injection valves 6, for respective cylinders, are inserted into the intake pipe 2 at locations intermediate between the engine 1 and the throttle valve 3 and slightly upstream of respective intake valves (not shown). All the fuel injection valves 6 are connected to a fuel pump (not shown), and electrically connected to the ECU 5. A valve opening period of each fuel injection valve 6 is controlled by a signal from the ECU 5.

An absolute intake pressure (PBA) sensor 8 is provided immediately downstream of the throttle valve 3. An absolute pressure signal converted to an electrical signal by the absolute intake pressure sensor 8 is supplied to the ECU 5. An intake air temperature (TA) sensor 9 is provided downstream of the absolute intake pressure sensor 8 to detect an intake air temperature TA. An electrical signal corresponding to the detected intake air temperature TA is output from the sensor 9 and supplied to the ECU 5.

An engine cooling water temperature (TW) sensor 10 such as a thermistor is mounted on the body of the engine 1 to detect an engine cooling water temperature TW. A temperature signal corresponding to the detected engine cooling water temperature TW is output from the sensor 10 and supplied to the ECU 5.

A cooling water passage (not shown) formed in the body of the engine 1 and a radiator 21 are connected by cooling water pipes 22 and 22A, and a cooling water is circulated between the engine 1 and the radiator 21 by a water pump (not shown). The cooling water pipe 22A is provided with a thermostat 23 for opening and closing the pipe 22A according to a cooling water temperature. The thermostat 23 is a bimetal temperature-sensitive switch valve. The thermostat 23 closes at starting of the engine 1 when the cooling water temperature is low, to prevent the cooling water from circulating between the engine 1 and the radiator 21, and opens when the cooling water temperature has become higher, to circulate the cooling water and thereby lower the cooling water temperature. The cooling system of the engine 1 consists mainly of the radiator 21, the cooling water pipes 22 and 22A, the thermostat 23, the cooling water passage formed in the body of the engine 1, and the water pump.

An engine rotational speed (NE) sensor 11 and a cylinder discrimination (CYL) sensor 12 are mounted near the outer periphery of a camshaft or a crankshaft (both not shown) of the engine 1. The engine rotational speed sensor 11 outputs a TDC signal pulse at a crank angle position before a top dead center (TDC) by a predetermined crank angle(at every 180 deg crank angle in the case of a four-cylinder engine). The top dead center (TDC) corresponds to the beginning of an intake stroke of each cylinder of the engine 1. The cylinder discrimination sensor 12 outputs a cylinder discrimination signal pulse at a predetermined crank angle position of a specific cylinder. These signal pulses output from the sensors 11 and 12 are supplied to the ECU 5.

An exhaust pipe 13 of the engine 1 is provided with a three-way catalyst 14. A proportional type air-fuel ratio sensor (which will be hereinafter referred to as "LAF sensor") 17 is mounted on the exhaust pipe 13 at a position upstream of the three-way catalyst 14. The LAF sensor 17 outputs an electrical signal substantially proportional to the oxygen concentration (air-fuel ratio) in the exhaust gases, and supplies the electrical signal to the ECU 5. A binary type oxygen concentration sensor having a characteristic such that its output rapidly changes in the vicinity of a stoichiometric ratio may be used as the air-fuel ratio sensor.

A vehicle speed sensor 18 for detecting a vehicle speed VPS of a vehicle driven by the engine 1 is connected to the ECU 5, and a detection signal from the vehicle speed sensor 18 is supplied to the ECU 5.

The ECU 5 includes an input circuit 5a having various functions including a function of shaping the waveforms of input signals from the various sensors, a function of correcting the voltage levels of the input signals to a predetermined level, and a function of converting analog signal values into digital signal values, a central processing unit (which will be hereinafter referred to as "CPU") 5b, a memory 5c preliminarily storing various operational programs to be executed by the CPU 5b and for storing the results of computation or the like by the CPU 5b, and an output circuit 5d for supplying drive signals to the fuel injection valves 6.

The CPU 5b determines various engine operating conditions according to various engine parameter signals as mentioned above, and computes a fuel injection period TOUT of each fuel injection valve 6 to be opened in synchronism with the TDC signal pulse, in accordance with Eq. (1) according to the above determined engine operating conditions.

$$TOUT = TIM \times KCMD \times KLAF \times K1 + K2 \qquad (1)$$

TIM is a basic fuel amount, more specifically, a basic fuel injection period of each fuel injection valve 6. The basic fuel amount TIM is determined by retrieving a TI map set according to the engine rotational speed NE and the absolute intake pressure PBA. The TI map is set so that the air-fuel ratio of an air-fuel mixture to be supplied to the engine 1 becomes substantially equal to the stoichiometric ratio in an operating condition according to the engine rotational speed NE and the absolute intake pressure PBA. Accordingly, the basic fuel amount TIM has values substantially proportional to an intake air amount (mass flow) per unit time of the engine 1.

KCMD is a target air-fuel ratio coefficient, which is set according to engine operational parameters such as the engine rotational speed NE, the throttle valve opening THA, and the engine cooling water temperature TW. The target air-fuel ratio coefficient KCMD is proportional to the reciprocal of an air-fuel ratio A/F, i.e., proportional to a fuel-air ratio F/A, and takes a value of 1.0 for the stoichiometric ratio.

KLAF is an air-fuel ratio correction coefficient calculated by PID (Proportional, Integral, and Differential) control so that a detected equivalent ratio KACT calculated from a detected value from the LAF sensor 17 becomes equal to the target equivalent ratio KCMD when the conditions for execution of feedback control are satisfied.

K1 is another correction coefficient and K2 is a correction variable. The correction coefficient K1 and the correction variable K2 are computed according to various engine parameter signals and determined to such predetermined values as to optimize various characteristics such as fuel consumption characteristics and engine acceleration characteristics according to engine operating conditions.

Figure 2:
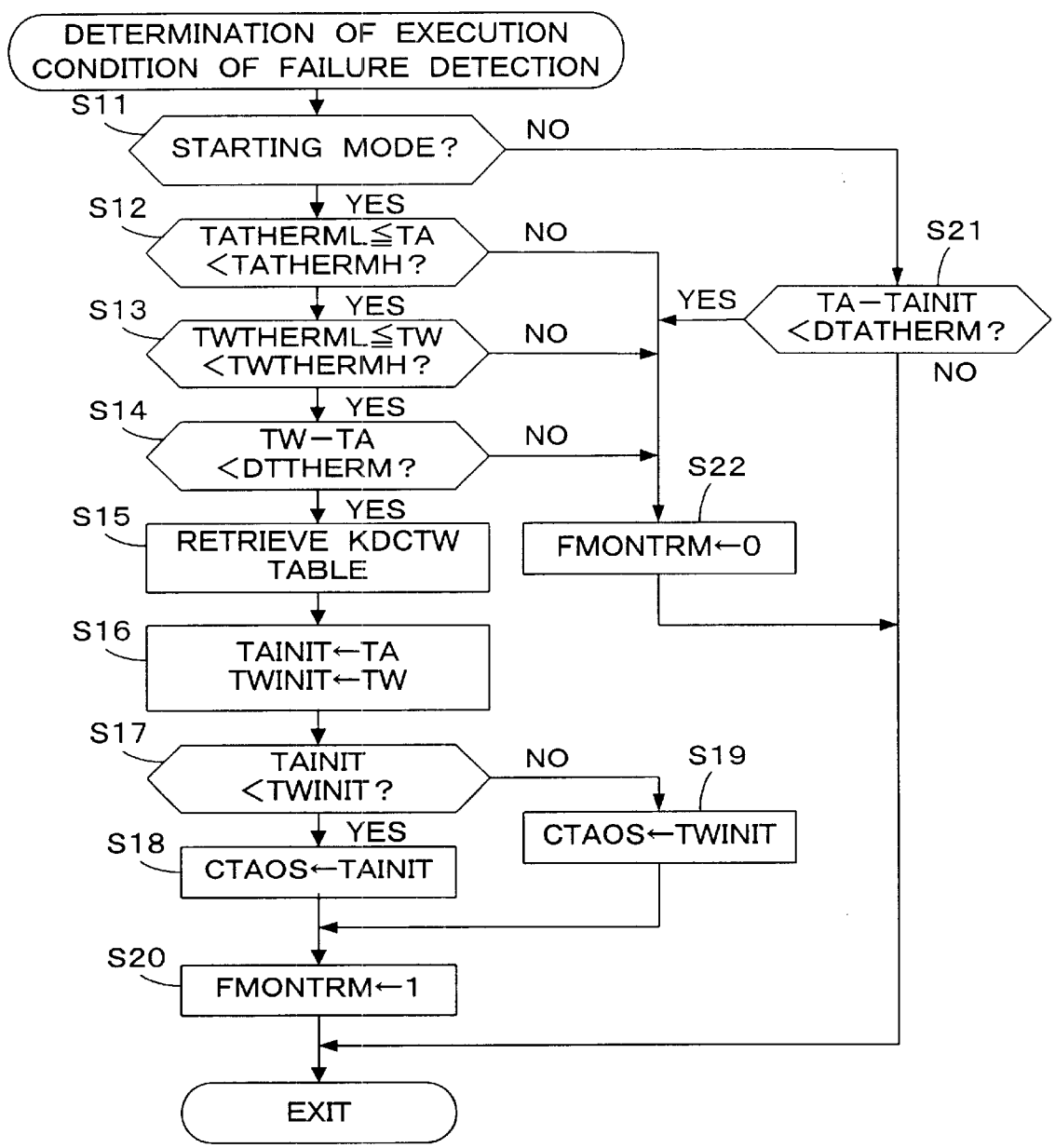
FIG. 2 is a flowchart showing a program for determining the conditions for execution of failure detection processing for a thermostat.

FIG. 2 is a flowchart showing a program for determining an execution condition of the failure detection processing (FIG. 4) of the thermostat 23. This program is executed by the CPU 5b at predetermined time intervals (e.g., at intervals of 2 seconds).

In step S11, it is determined whether or not the engine 1 is in a starting mode, i.e., during cranking. If the engine 1 is in the starting mode, it is determined whether or not the intake air temperature TA is in the range between a predetermined upper limit TATHERMH (e.g., 50 degrees centigrade) and a predetermined lower limit TATHERML (e.g., −7 degrees centigrade) (step S12). If TA is higher than or equal to TATHERML and lower than TATHERMH, it is determined whether or not the engine cooling water temperature TW is in the range between a predetermined upper limit TWTHERMH (e.g., 50 degrees centigrade) and a predetermined lower limit TWTHERML (e.g., −7 degrees centigrade) (step S13). If TW is higher than or equal to TWTHERML and lower than TWTHERMH, it is determined whether or not the difference (TW−TA) between the engine cooling water temperature TW and the intake air temperature TA is smaller than a predetermined value DTTHERM (e.g., 10 degrees centigrade) (step S14). If the answer to any one of steps S12 to S14 is negative (NO), it is determined that the execution conditions are not satisfied, and an execution condition flag FMONTRM is set to "0" (step S22). The flag FMONTRM indicates the satisfaction of the execution conditions when set to "1". Then, this program ends.

If the answers to all of steps S12 to S14 are affirmative (YES), that is, if the intake air temperature TA and the engine cooling water temperature TW are in the respective predetermined ranges and the difference (TW−TA) is smaller than the predetermined value DTTHERM, it is determined that the execution condition is satisfied, and the program proceeds to step S15. The condition that the difference between the engine cooling water temperature TW and the intake air temperature TA is small means that the time period of stoppage of the engine 1 is long and the engine cooling water temperature TW has lowered to a temperature near the outside air temperature.

Figure 3:
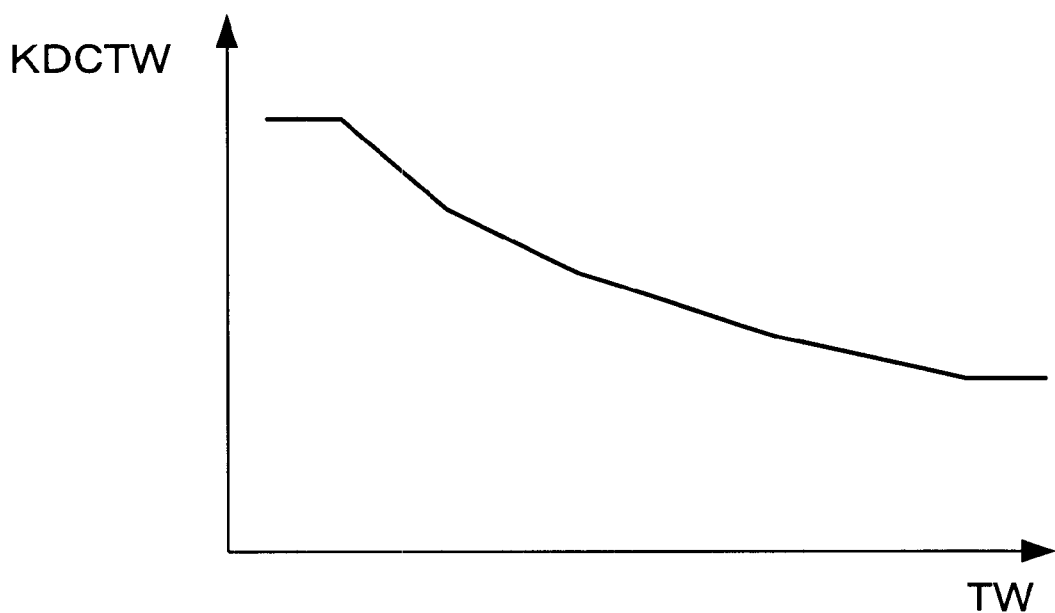
FIG. 3 is a graph showing a table used in the processing shown in FIG. 2.

In step S15, a KDCTW table shown in FIG. 3 is retrieved according to the engine cooling water temperature TW to calculate an estimated water temperature correction coefficient KDCTW. The estimated water temperature correction coefficient KDCTW is used for calculation of an estimated value CTW of the engine cooling water temperature TW (the estimated value CTW will be hereinafter referred to as "estimated water temperature") in step S43 shown in FIG. 4 described below. The KDCTW table is set so that the correction coefficient KDCTW decreases with an increase in the engine cooling water temperature TW.

In step S16, the intake air temperature TA and the engine cooling water temperature TW during cranking are stored respectively as an initial intake air temperature TAINIT and an initial water temperature TWINIT. Then, it is determined whether or not the initial intake air temperature TAINIT is lower than the initial water temperature TWINIT (step S17). If TAINIT is lower than TWINIT, an outside air temperature CTAOS at cranking (CTAOS is hereinafter referred to as "cranking outside air temperature) is set to the initial intake air temperature TAINIT (step S18), while if TAINIT is higher than or equal to TWINIT, the cranking outside air temperature CTAOS is set to the initial water temperature TWINIT (step S19). That is, if the difference between the engine cooling water temperature TW and the intake air temperature TA is small (if the answer to step S14 is affirmative (YES)), it is considered that a smaller one of the initial intake air temperature TAINIT and the initial water temperature TWINIT substantially coincides with the outside air temperature at cranking, so that the smaller temperature is stored as the cranking outside air temperature CTAOS. The cranking outside air temperature CTAOS is used for calculation of a difference DCTW between the estimated water temperature CTW and the outside air temperature CTAOS in step S34 shown in FIG. 4 described below.

In step S20, the execution condition flag FMONTRM is set to "1". Then, this program ends.

When the cranking of the engine 1 is completed, the program proceeds from step S11 to step S21, in which it is determined whether or not the difference (TA−TAINIT) between the present intake air temperature TA and the initial intake air temperature TAINIT is smaller than a predetermined value DTATHERM (e.g., −2 degrees centigrade). If the answer to step S21 is affirmative (YES), that is, if a decrease in the outside air temperature (TA) is large, it is considered that the time period of stoppage of the engine 1 is insufficient or the decrease in outside air temperature after cranking is large, causing a large possibility of improper determination. Therefore, in this case, it is determined that the execution condition is not satisfied, and the program proceeds to step S22.

According to the processing shown in FIG. 2, the execution condition of failure detection processing of the thermostat 23 is satisfied when the engine 1 is started in the condition where it is cooled to a temperature substantially equal to the outside air temperature, and the satisfaction of the execution condition is maintained if a change in the outside air temperature after starting the engine 1 is small (if the answer to step S21 is negative (NO)).

Figure 4:
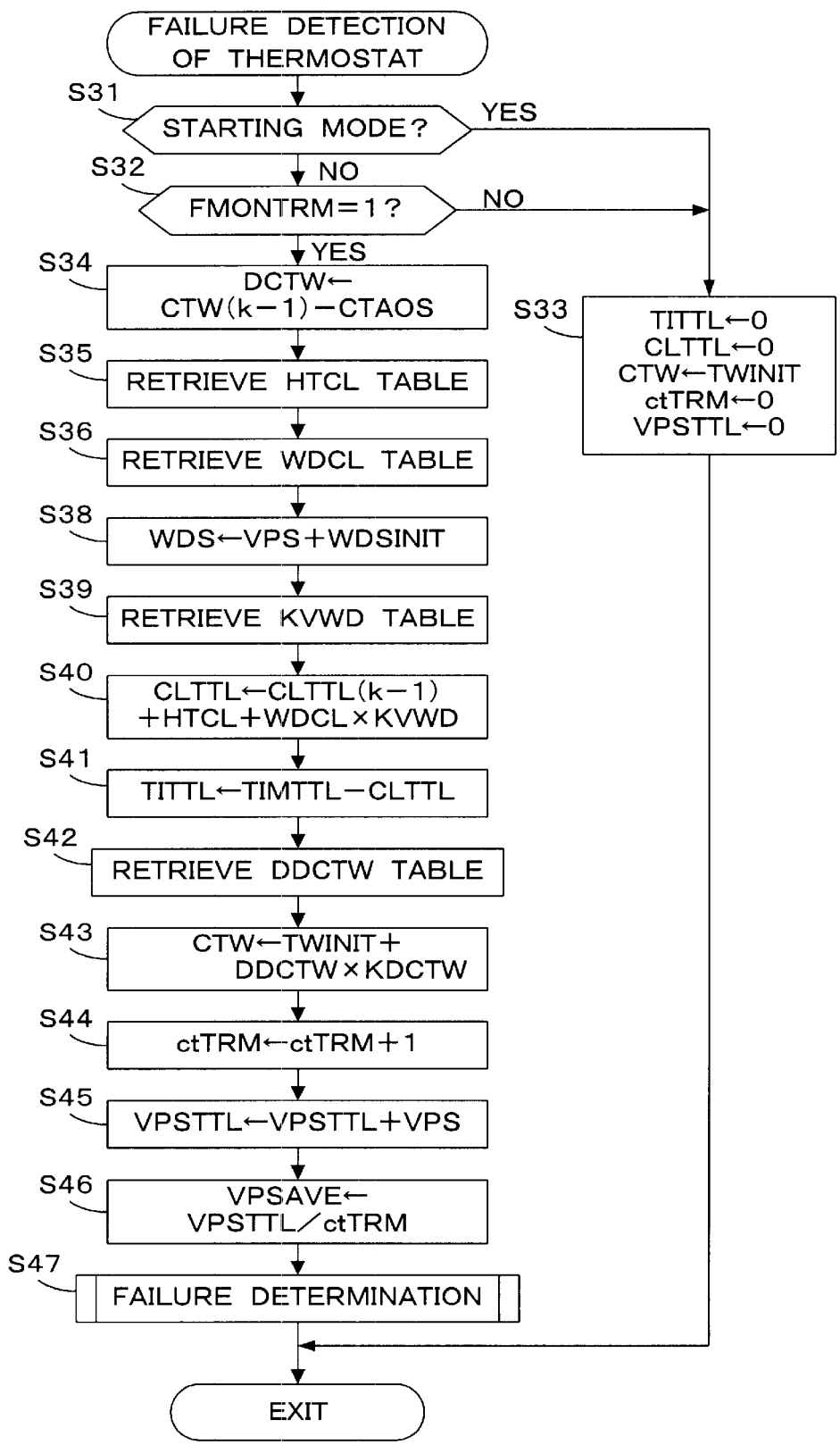
FIG. 4 is a flowchart showing a program for failure detection processing for the thermostat.

FIG. 4 is a flowchart showing a program for failure detection processing of the thermostat 23. This program is executed by the CPU 5b at predetermined time intervals (e.g., at intervals of 2 seconds).

In step S31, it is determined whether or not the engine 1 is in the starting mode. If the engine 1 is in the starting mode, various parameters to be used in this processing are initialized (step S33). More specifically, a thermal load parameter TITTL having a value according to a heat quantity generated by the engine 1 is set to "0", a cooling loss integrated value CLTTL which is an integrated value of a heater loss HTCL corresponding to a heat quantity lost by a heater for heating a vehicle compartment and a wind loss WDCL corresponding to a heat quantity lost by the wind is set to "0", the estimated water temperature CTW to be calculated in step S43 is set to the initial water temperature TWINIT, a value of a counter ctTRM to be used in step S44 is set to "0", and a vehicle speed integrated value VPSTTL to be used in average vehicle speed calculation (step S46) is set to "0". Then, this program ends.

After completing the starting mode, the program proceeds from step S31 to step S32, in which it is determined whether or not the execution condition flag FMONTRM is "1". If FMONTRM is "0", the program proceeds to step S33. If FMONTRM is "1", a difference DCTW between a previous value CTW(k−1) of the estimated water temperature and the cranking outside air temperature CTAOS (the difference DCTW will be hereinafter referred to as "after-starting water temperature rise") is calculated in accordance with Eq. (2) (step S34).

$$DCTW = CTW(k-1) - CTAOS \tag{2}$$

where (k−1) is attached to indicate a previous value. Since all the parameter values are usually present values, (k) indicating a present value may be omitted.

Figure 5A:
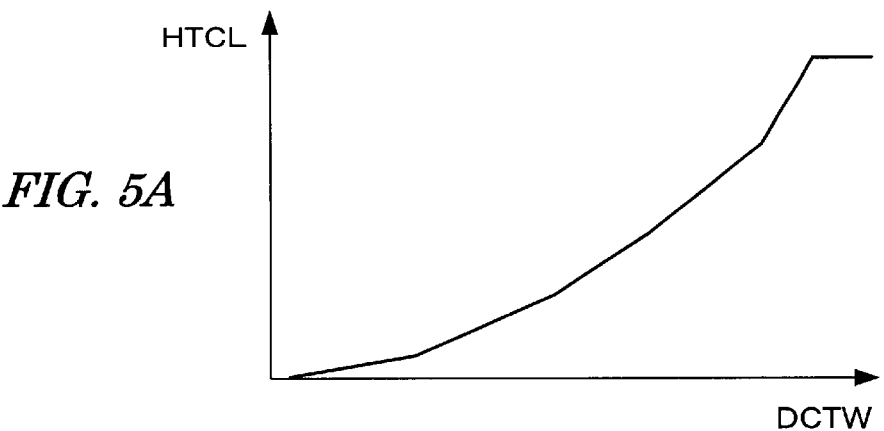
FIGS. 5A to 5D are graphs showing tables used in the processing shown in FIG. 4.

In step S35, a HTCL table shown in FIG. 5A is retrieved according to the after-starting water temperature rise DCTW to calculate a heater loss HTCL. The HTCL table is set so that the heater loss HTCL increases with an increase in the after-starting water temperature rise DCTW.

Figure 5B:
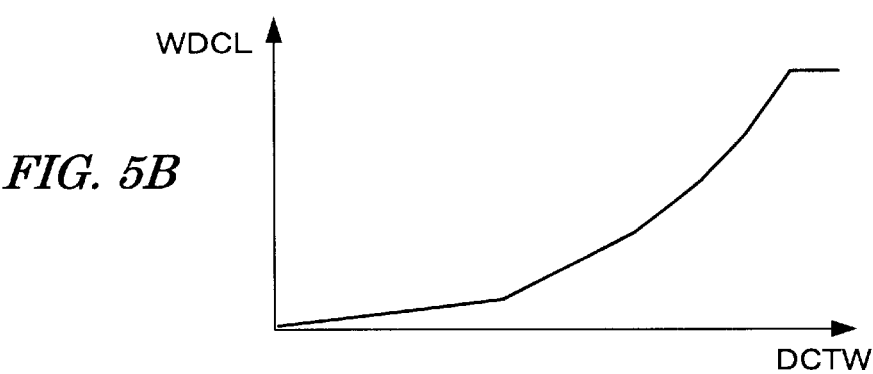

In step S36, a WDCL table shown in FIG. 5B is retrieved according to the after-starting water temperature rise DCTW to calculate a wind loss WDCL. The WDCL table is set so that the wind loss WDCL increases with an increase in the after-starting water temperature rise DCTW.

Each of the heater loss HTCL and the wind loss WDCL is calculated as a value converted into a fuel injection time (fuel injection amount) per unit time, that is, as a parameter value having the same dimension as that of a thermal load parameter TITTL described below.

Figure 5C:
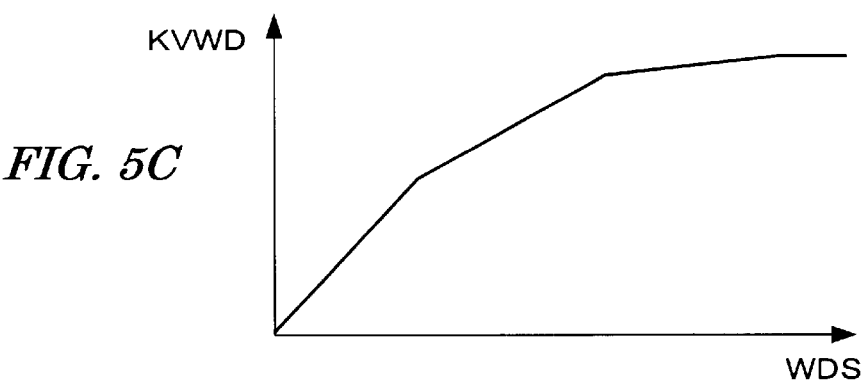

In step S38, a wind speed WDSINIT (fixed value) of a strong wind is added to the vehicle speed VPS to calculate an estimated relative wind speed WDS. Then, a KVWD table shown in FIG. 5C is retrieved according to the estimated relative wind speed WDS to calculate a wind speed correction coefficient KVWD (step S39). The KVWD table is set so that the wind speed correction coefficient KVWD increases with an increase in the estimated relative wind speed WDS.

In step S40, a cooling loss integrated value CLTTL is calculated in accordance with Eq. (3).

$$CLTTL = CLTTL(k-1) + HTCL + WDCL \times KVWD \tag{3}$$

Figure 6:
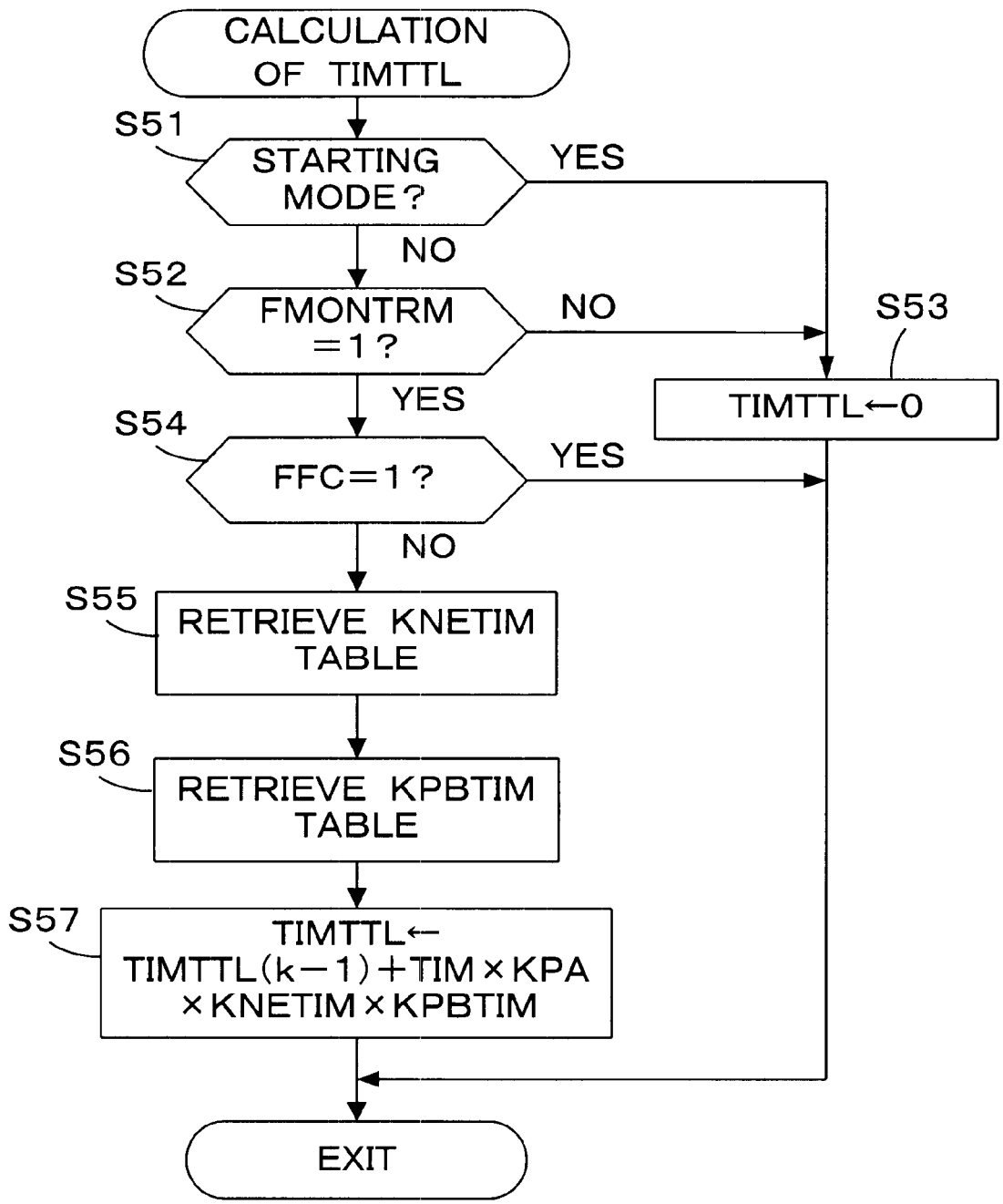
FIG. 6 is a flowchart showing a program for calculating an integrated value (TIMTTL) of a heat quantity generated from the internal combustion engine.

In step S41, a generated heat quantity integrated value TIMTTL to be calculated in the processing shown in FIG. 6 and the cooling loss integrated value CLTTL are applied to Eq. (4) to calculate a thermal load parameter TITTL.

$$TITTL = TIMTTL - CLTTL \tag{4}$$

The generated heat quantity integrated value TIMTTL is calculated by integrating the product of the basic fuel amount TIM in Eq. (1) and correction coefficients according to the atmospheric pressure PA, the engine rotational speed NE, and the absolute intake pressure PBA. As described above, the basic fuel amount TIM has a value substantially proportional to an intake air amount (mass flow) per unit time by the engine, and it is considered that the heat quantity generated from the engine is substantially proportional to an intake air amount. Accordingly, by integrating the basic fuel amount TIM, it is possible to obtain the generated heat quantity integrated value TIMTTL proportional to a generated heat quantity after completing the engine starting. By subtracting the cooling loss integrated value CLTTL from the generated heat quantity integrated value TIMTTL, it is possible to obtain the thermal load parameter TITTL as a parameter proportional to an integrated value of heat quantity causing a temperature rise of the engine 1 (engine cooling water).

Figure 5D:
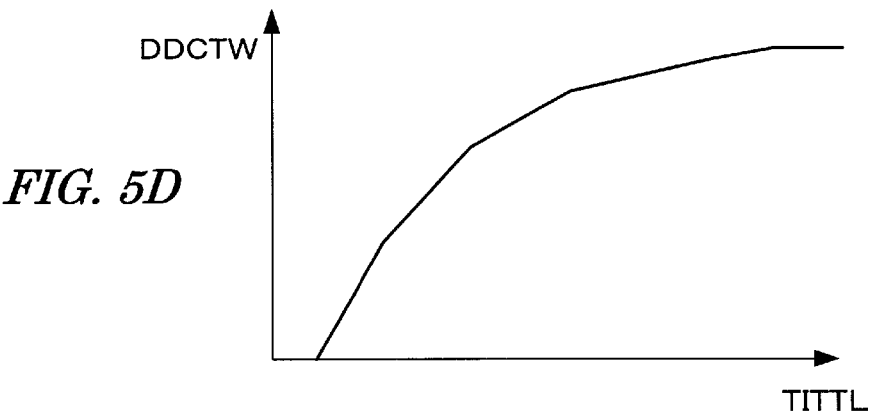

In step S42, a DDCTW table shown in FIG. 5D is retrieved according to the thermal load parameter TITTL to calculate an estimated water temperature rise DDCTW. The DDCTW table is set so that the estimated water temperature rise DDCTW increases with an increase in the thermal load parameter TITTL.

In step S43, the initial water temperature TWINIT, the estimated water temperature rise DDCTW, and the estimated water temperature correction coefficient KDCTW calculated in step S15 shown in FIG. 2 are applied to Eq. (5) to calculate the estimated water temperature CTW.

$$CTW = TWINIT + DDCTW \times KDCTW \quad (5)$$

Figure 8:
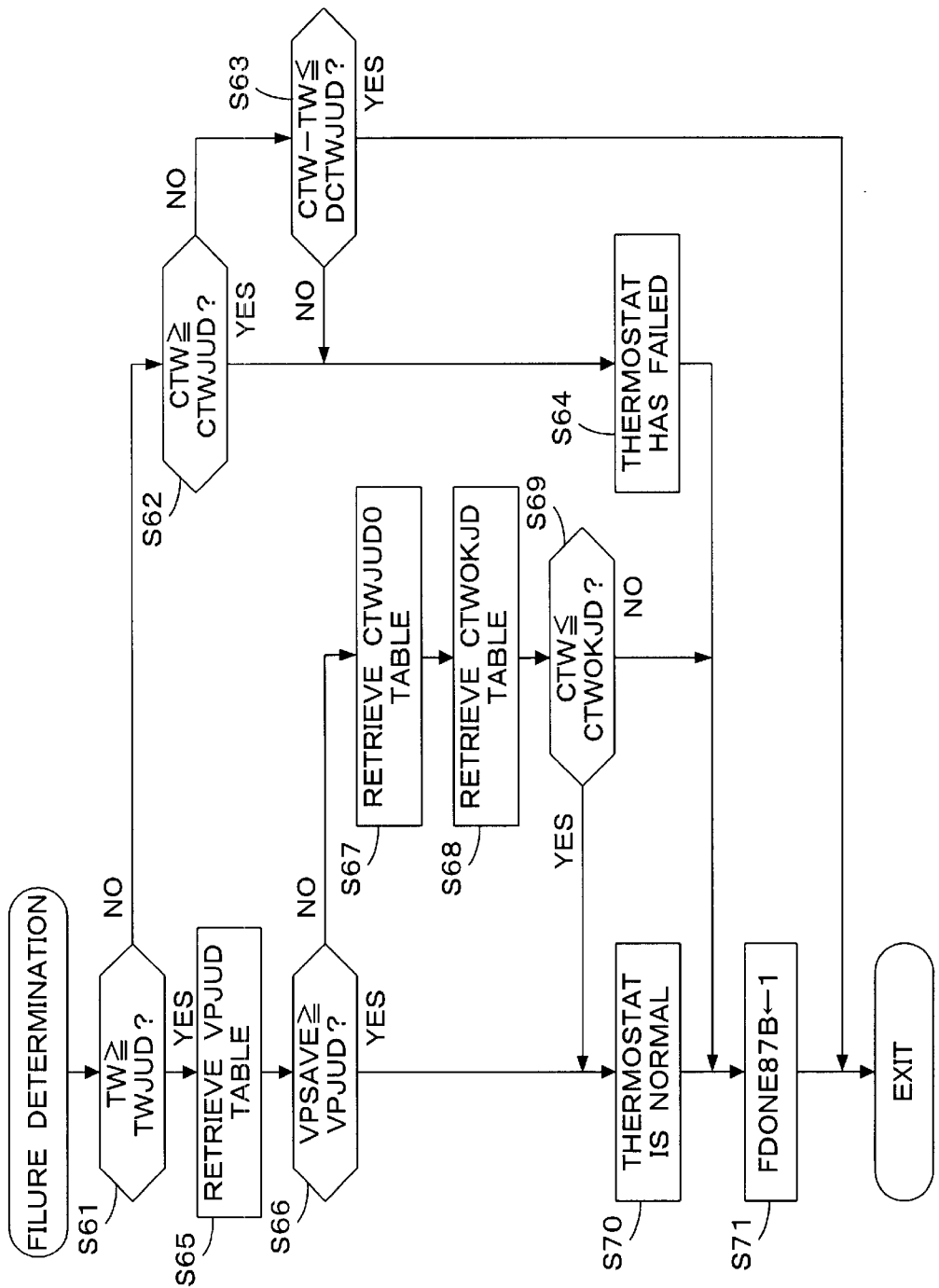
FIG. 8 is a flowchart showing a program for failure determination for the thermostat.

In step S44, the counter ctTRM is incremented by "1". In step S45, the vehicle speed integrated value VPSTTL is incremented by the present vehicle speed VPS. In step S46, the vehicle speed integrated value VPSTTL is divided by the value of the counter ctTRM to calculate an average vehicle speed VPSAVE. In step S47, failure determination processing shown in FIG. 8 is executed.

FIG. 6 is a flowchart showing a program for calculating the generated heat quantity integrated value TIMTTL used for the calculation of the thermal load parameter TITTL in step S41 shown in FIG. 4. This program is executed by the CPU 5b in synchronism with the generation of a TDC signal pulse.

In step S51, it is determined whether or not the engine 1 is in the starting mode. If the engine 1 is in the starting mode, the generated heat quantity integrated value TIMTTL is set to "0" (step S53), and this program ends. After completing the starting, the program proceeds from step S51 to step S52, in which it is determined whether or not the execution condition flag FMONTRM is "1". If FMONTRM is "0", the program proceeds to step S53. If FMONTRM is "1", which indicates that the execution condition of failure determination is satisfied, it is determined whether or not a fuel cut flag FFC is "1" (step S54). The flag FFC indicates the interruption of fuel supply when set to "1". If FFC is "1", which indicates that the fuel supply is being interrupted, no combustion occurs in the engine 1. Accordingly, this program ends immediately.

Figure 7A:
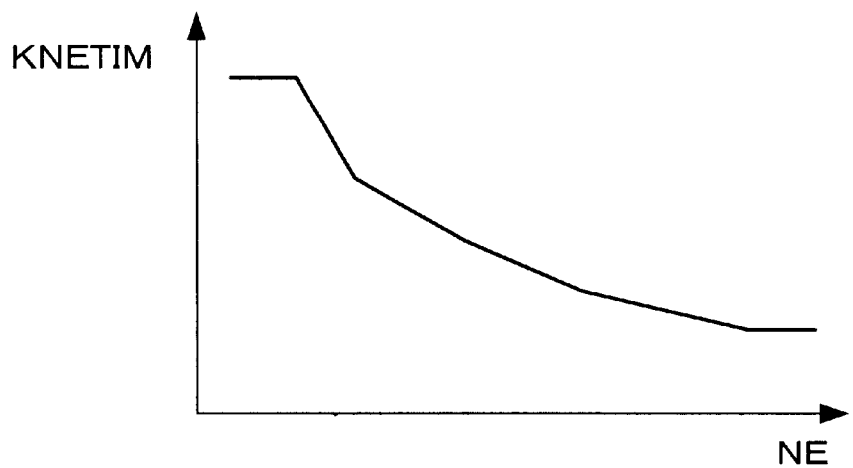
FIGS. 7A and 7B are graphs showing tables used in the processing shown in FIG. 6.

If FFC is "0", a KNETIM table shown in FIG. 7A is retrieved according to the engine rotational speed NE to calculate an engine rotational speed correction coefficient KNETIM (step S55). The KNETIM table is set so that the correction coefficient KNETIM decreases with an increase in the engine rotational speed NE.

Figure 7B:
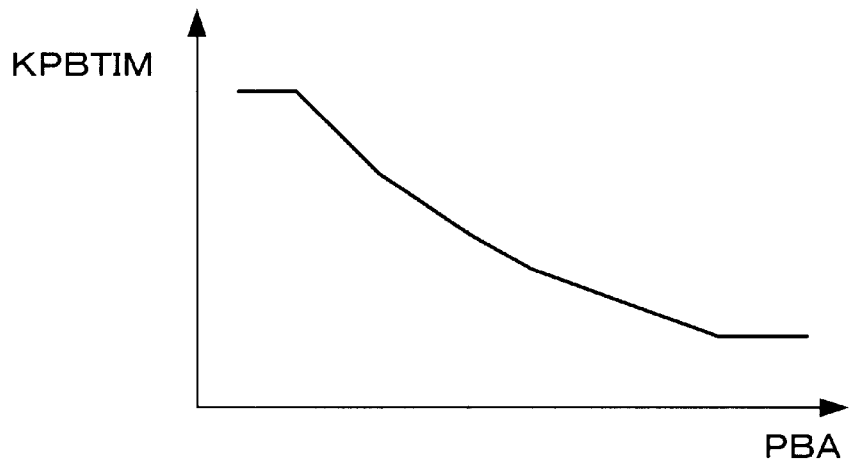

In step S56, a KPBTIM table shown in FIG. 7B is retrieved according to the absolute intake pressure PBA to calculate an intake pressure correction coefficient KPBTIM. The KPBTIM table is set so that the correction coefficient KPBTIM decreases with an increase in the absolute intake pressure PBA.

In step S57, the basic fuel amount TIM, an atmospheric pressure correction coefficient KPA set according to the atmospheric pressure, the engine rotational speed correction coefficient KNETIM, and the intake pressure correction coefficient KPBTIM are applied to Eq. (6) to calculate the generated heat quantity integrated value TIMTTL.

$$TIMTTL = TIMTTL(k-1) + TIM \times KPA \times KNETIM \times KPBTIM \quad (6)$$

By the processing shown in FIG. 6, the basic fuel amount TIM during the execution of failure determination is corrected according to the atmospheric pressure PA, the engine rotational speed NE, and the absolute intake pressure PBA, and the corrected value of the basic fuel amount TIM is integrated to calculate the generated heat quantity integrated value TIMTTL.

FIG. 8 is a flowchart showing a program for failure determination executed in step S47 shown in FIG. 4.

In step S61, it is determined whether or not the engine cooling water temperature TW is higher than or equal to a predetermined water temperature TWJUD (e.g., 70 degrees centigrade). If TW is lower than TWJUD, the program proceeds to step S62, in which it is determined whether or not the estimated water temperature CTW is higher than or equal to a predetermined estimated water temperature CTWJUD (e.g., 75 degrees centigrade). Since CTW is lower than CTWJUD at first, it is determined whether or not the difference (CTW−TW) between the estimated water temperature CTW and the detected water temperature TW is smaller than or equal to a predetermined difference DCTWJUD (e.g., 15 degrees centigrade) (step S63). If the difference (CTW−TW) is smaller than or equal to DCTWJUD, this program ends. If the difference (CTW−TW) is higher than DCTWJUD, which indicates that the difference between the estimated water temperature CTW and the detected water temperature TW is large, it is determined that the rise of the engine cooling water temperature TW is slow and that the thermostat has failed (e.g., abnormality such as increased leakage in the valve closed condition, decrease in valve opening temperature, or fixation in the full open condition of the valve has occurred) (step S64). Then, an end flag FDONE87B is set to "1" (step S71), indicating the end of the failure detection processing. Thereafter, this program ends.

Further, if the estimated water temperature CTW becomes higher than or equal to the predetermined estimated water temperature CTWJUD in step S62 before the engine cooling water temperature TW becomes higher than or equal to TWJUD in step S61, it is determined that the rise of the engine cooling water temperature TW is slow and that the thermostat has failed (step S64).

Figure 9A:
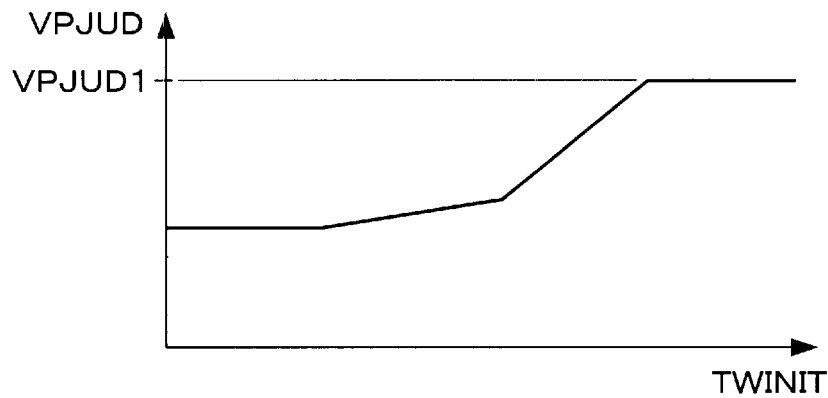
FIGS. 9A to 9C are graphs showing tables used in the processing shown in FIG. 8.

If the engine cooling water temperature TW becomes higher than or equal to the predetermined water temperature TWJUD in step S61 before CTW becomes higher than or equal to CTWJUD in step S62, a VPJUD table shown in FIG. 9A is retrieved according to the initial water temperature TWINIT to calculate an OK determination vehicle speed VPJUD (step S65). The VPJUD table is set so that the OK determination vehicle speed VPJUD increases up to a predetermined vehicle speed VPJUD1 with an increase in the initial water temperature TWINIT. The predetermined vehicle speed VPJUD1 is set to 30 km/h, for example.

Then, it is determined whether or not the average vehicle speed VPSAVE is higher than or equal to the OK determination vehicle speed VPJUD calculated in step S65 (step S66). If VPSAVE is higher than or equal to VPJUD, it is determined that the thermostat is normal (step S70), and the program proceeds to step S71.

Figure 9B:
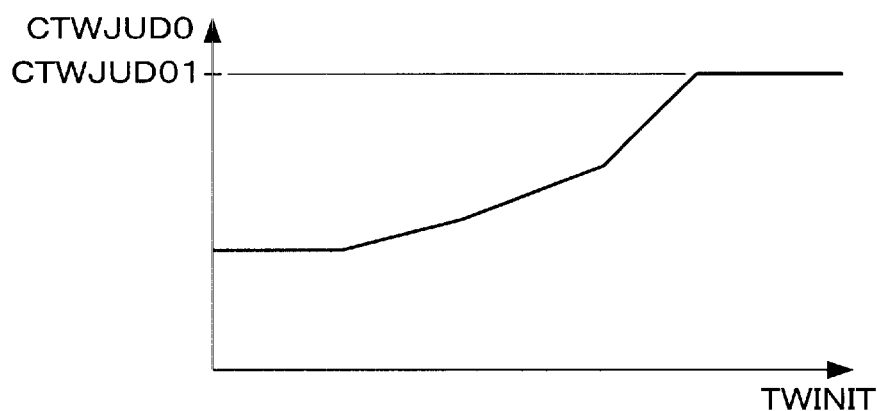

If VPSAVE is lower than VPJUD in step S66, a CTWJUD0 table shown in FIG. 9B is retrieved according to the initial water temperature TWINIT to calculate a first estimated water temperature CTWJUD0 corresponding to the case where the average vehicle speed VPSAVE is "0" (see FIG. 9C) (step S67). The CTWJUD0 table is set so that the first estimated water temperature CTWJUD0 increases up to a predetermined estimated water temperature CTWJUD01 with an increase in the initial water temperature TWINIT. The predetermined estimated water temperature CTWJUD01 shown in FIG. 9B is an estimated water temperature in the case that an idling condition (vehicle speed VPS=0) is continued with a failed thermostat and the engine cooling water temperature TW reaches the predetermined water temperature TWJUD most rapidly. The predetermined estimated water temperature CTWJUD01 is set to 58 degrees centigrade, for example.

Figure 9C:
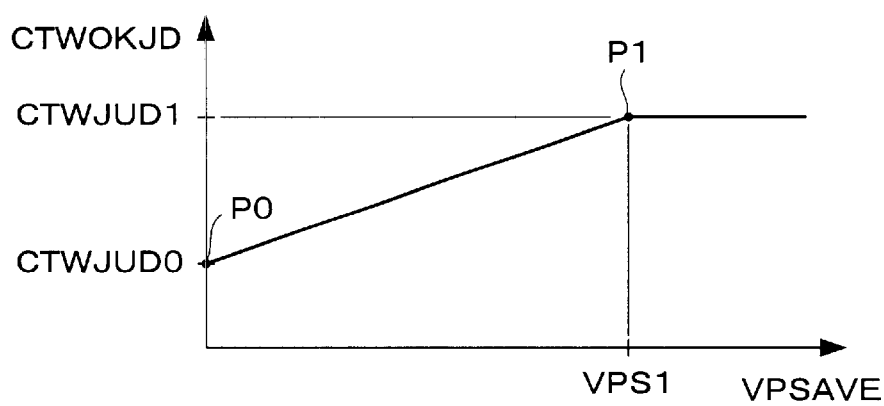

In step S68, a CTWOKJD table shown in FIG. 9C is retrieved according to the average vehicle speed VPSAVE to calculate an OK determination threshold CTWOKJD. In the CTWOKJD table, a value (point P0) of the threshold CTWOKJD corresponding to the average vehicle speed VPSAVE=0 is set to the first estimated water temperature CTWJUD0 calculated in step S67, and a second estimated water temperature CTWJUD1 (point P1) corresponding to a predetermined vehicle speed VPS1 (e.g., 30 km/h) is set to 75 degrees centigrade, for example. Accordingly, when the average vehicle speed VPSAVE is higher than 0 and lower than the predetermined vehicle speed VPS1, the OK determination threshold CTWOKJD is set to a value obtained by linear interpolation between the point P0 and the point P1 according to the average vehicle speed VPSAVE.

In step S69, it is determined whether or not the estimated water temperature CTW is lower than or equal to the OK determination threshold CTWOKJD calculated in step S68. If CTW is lower than or equal to CTWOKJD, it is determined that the thermostat is normal (step S70). If CTW is higher than CTWOKJD, it is determined that the rise of the engine cooling water temperature TW is slower than the rise of the estimated water temperature CTW and that the thermostat cannot be determined to be normal. However, the rise of the engine cooling water temperature TW is not so slow that the thermostat is determined to have failed (i.e., the answer to step S61 becomes affirmative (YES) before the answer to step S62 becomes affirmative (YES)). Accordingly, in this case, the determination of whether or not the thermostat has failed is withheld, and the program proceeds to step S71.

Figure 10A:
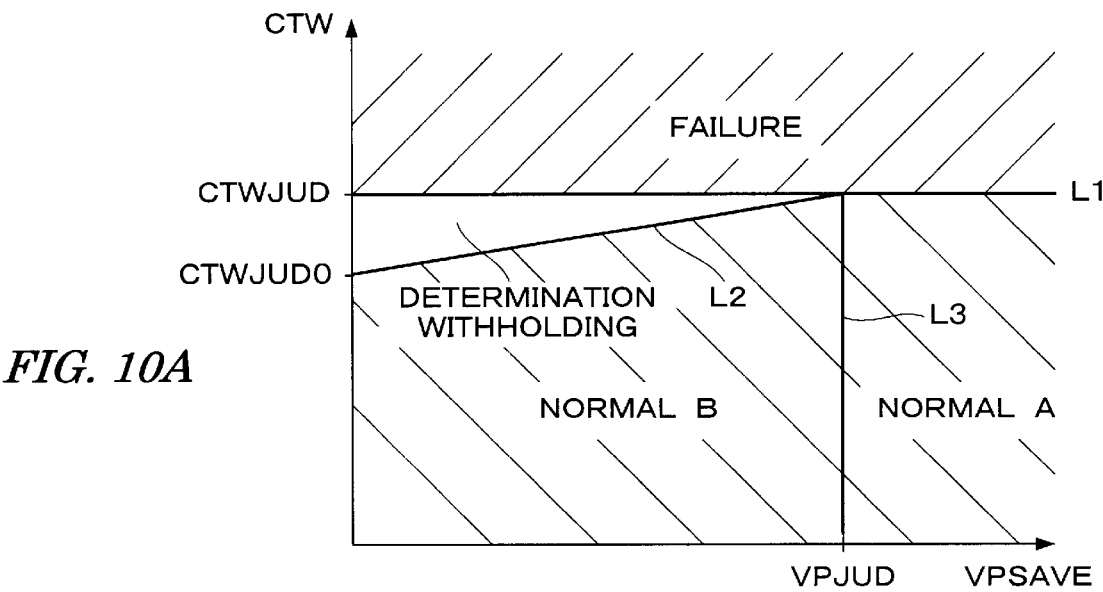
FIGS. 10A and 10B are graphs for illustrating the processing shown in FIG. 8.
Figure 10B:
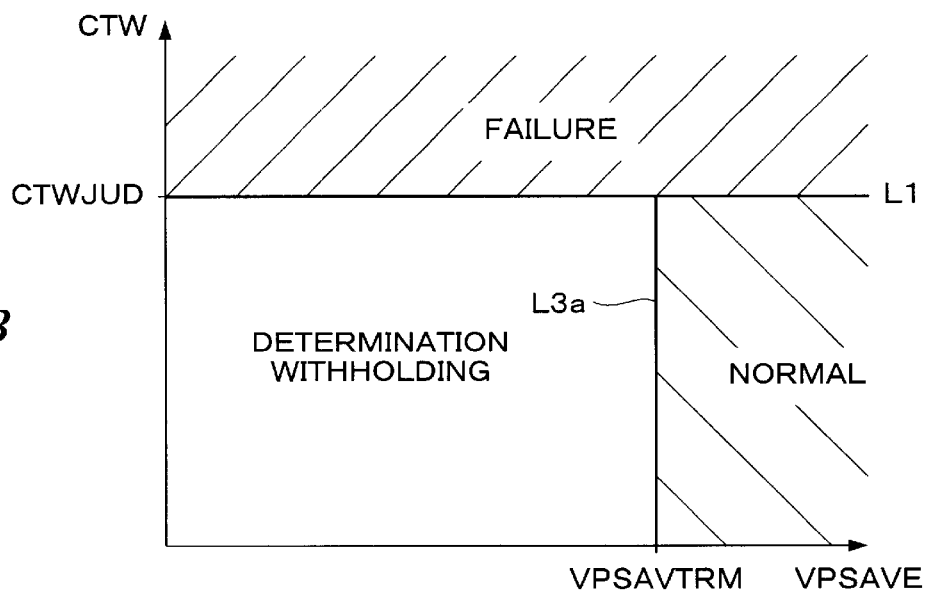

FIGS. 10A and 10B are graphs for illustrating the failure determination by the processing shown in FIG. 8 in comparison with the conventional failure determination shown in Japanese Patent Laid-open No. 2000-8853.

FIG. 10B shows the above conventional failure determination. As shown in FIG. 10B, when the set of the average vehicle speed VPSAVE and the estimated water temperature CTW at the time the engine cooling water temperature (detected water temperature) TW has reached a predetermined water temperature TWJUD (e.g., 70 degrees centigrade) (which time will be hereinafter referred to as "warm-up finishing time") is in a failure region defined by a straight line L1 corresponding to a predetermined estimated water temperature CTWJUD, it is determined that the thermostat has failed. When the set of VPSAVE and CTW at the warm-up finishing time is in a normal region defined by a straight line L3a corresponding to a predetermined vehicle speed VPSAVTRM and the straight line L1, it is determined that the thermostat is normal. When the set of VPSAVE and CTW at the warm-up finishing time is in a determination withholding region defined by the straight line L1 and the straight line L3a, the determination of whether or not the thermostat has failed is withheld. In this case, a radiator fan is operated for a predetermined time period, and thereafter the failure determination is executed again.

On the other hand, FIG. 10A shows the failure determination by the processing shown in FIG. 8. As shown in FIG. 10A, when the estimated water temperature CTW at the warm-up finishing time is higher than or equal to a predetermined estimated water temperature CTWJUD (e.g., 75 degrees centigrade), it is determined that the thermostat has failed, regardless of the average vehicle speed VPSAVE (in a failure region hatched by the lines inclined upward to the right). When the estimated water temperature CTW at the warm-up finishing time is lower than the predetermined estimated water temperature CTWJUD, and the average vehicle speed VPSAVE is higher than or equal to the OK determination vehicle speed VPJUD set according to the initial water temperature TWINIT, it is determined that the thermostat is normal (in a normal region A hatched by the lines inclined downward to the right and defined by the straight lines L1 and L3). When the estimated water temperature CTW at the warm-up finishing time is lower than the predetermined estimated water temperature CTWJUD, the average vehicle speed VPSAVE is lower than the OK determination vehicle speed VPJUD set according to the initial water temperature TWINIT, and the estimated water temperature CTW is lower than a value on a straight line L2, it is determined that the thermostat is normal (in a normal region B hatched by the lines inclined downward to the right and defined by the straight lines L2 and L3). The straight line L2 corresponds to the straight line connecting the point P0 and the point P1 in the CTWOKJD table shown in FIG. 9C. Accordingly, the determination of whether or not the thermostat has failed is withheld, only when the set of the average vehicle speed VPSAVE and the estimated water temperature CTW is in a region defined by the straight lines L1 and L2.

According to this preferred embodiment, the OK determination threshold CTWOKJD set according to the average vehicle speed VPSAVE is introduced to thereby allow rapid determination even in a region of low vehicle speeds (VPSAVE<VPJUD), so that a degradation in fuel economy or a degradation in heater performance due to the operation of a radiator fan can be prevented.

Further, according to this preferred embodiment, the OK determination vehicle speed VPJUD is set according to the initial water temperature TWINIT, so that accurate determination can be performed regardless of the values of the initial water temperature TWINIT.

In this preferred embodiment, the failure detection apparatus for the cooling system of the engine consists of the engine cooling water temperature sensor 10 as the cooling water temperature detecting means, the vehicle speed sensor 18 as the vehicle speed detecting means, the absolute intake pressure sensor 8, the intake air temperature sensor 9, the engine rotational speed sensor 11, and the ECU 5. More specifically, steps S34 to S43 shown in FIG. 4 executed by the CPU 5b in the ECU 5 correspond to the estimated cooling water temperature calculating means or the estimated cooling water temperature calculating module. The processing shown in FIG. 8 corresponds to the determining means or the determining module. Steps S44 to S46 in FIG. 4 correspond to the average vehicle speed calculating means or the average vehicle speed calculating module. Steps S35 to S41 in FIG. 4 correspond to the thermal load parameter calculating means or the thermal load parameter calculating module. The processing shown in FIG. 6 corresponds to the generated heat quantity calculating means or the generated heat quantity calculating module. Steps S35 to S40 in FIG. 4 correspond to the cooling loss calculating means or the cooling loss calculating module. The processing shown in FIG. 2 corresponds to the determination permitting means or the determination permitting module.

The processing shown in FIG. 8 may be modified as shown in FIG. 11. In the processing shown in FIG. 11, step S62 is executed at the time the engine cooling water temperature TW becomes higher than or equal to TWJUD in step S61. However, the processing shown in FIG. 8 has an advantage over the processing shown in FIG. 11 such that the failure determination can be performed more rapidly because it is performed at the time the estimated water temperature CTW becomes higher than or equal to the predetermined estimated water temperature CTWJUD.

What is claimed is:

1. A failure detection apparatus for a cooling system of an internal combustion engine, said cooling system having a radiator, a cooling water pipe for circulating a cooling water in said engine to said radiator, and a thermostat provided in said cooling water pipe for opening and closing said cooling water pipe, said failure detection apparatus detecting failure of said thermostat and comprising:

vehicle speed detecting means for detecting a vehicle speed of a vehicle driven by said engine;

operating condition detecting means for detecting an operating condition of said engine, said operating condition detecting means including cooling water temperature detecting means for detecting a temperature of the cooling water;

estimated cooling water temperature calculating means for calculating an estimated cooling water temperature of said engine according to said operating condition detected by said operating condition detecting means; and determining means for comparing said estimated cooling water temperature and a determination threshold set according to said vehicle speed at the time said cooling water temperature detected by said cooling water temperature detecting means has exceeded a predetermined water temperature, to thereby determine that said thermostat is normal.

2. A failure detection apparatus according to claim 1, wherein said determining means determines that said thermostat is normal when the estimated cooling water temperature is lower than or equal to the determination threshold.

3. A failure detection apparatus according to claim 1, wherein the determination threshold is set to a value decreasing with a decrease in the vehicle speed.

4. A failure detection apparatus according to claim 3, further comprising average vehicle speed calculating means for calculating an average vehicle speed after completion of starting of said engine, wherein said determination threshold is set according to said average vehicle speed.

5. A failure detection apparatus according to claim 1, further comprising average vehicle speed calculating means for calculating an average vehicle speed after completion of starting of said engine, wherein said determining means determines that said thermostat is normal when the estimated cooling water temperature is lower than a predetermined estimated water temperature value that is higher than the predetermined water temperature, and the average vehicle speed is higher than or equal to a determination vehicle speed at the time the detected cooling water temperature has exceeded the predetermined water temperature.

6. A failure detection apparatus according to claim 5, wherein the determination vehicle speed is set according to an initial cooling water temperature at starting of said engine.

7. A failure detection apparatus according to claim 1, wherein said estimated cooling water temperature calculating means comprises thermal load parameter calculating means for calculating a thermal load parameter indicating a degree of raising the cooling water temperature, wherein said estimated cooling water temperature calculating means calculates the estimated cooling water temperature according to the thermal load parameter and an initial cooling water temperature at starting of said engine.

8. A failure detection apparatus according to claim 7, wherein said thermal load parameter calculating means comprises generated heat quantity calculating means for calculating a generated heat quantity integrated value indicating an integrated value of a heat quantity generated from said engine after starting of said engine and cooling loss calculating means for calculating a cooling loss integrated value indicating an integrated value of a heat quantity lost by a heater in said vehicle and a heat quantity lost by a wind after starting of said engine, wherein said thermal load parameter calculating means calculates the thermal load parameter according to the generated heat quantity integrated value and the cooling loss integrated value.

9. A failure detection apparatus according to claim 8, wherein said generated heat quantity calculating means calculates said generated heat quantity integrated value according to an intake air amount per unit time of said engine, and said cooling loss calculating means calculates the cooling loss integrated value according to an estimated water temperature rise after starting of said engine and the vehicle speed.

10. A failure detection apparatus according to claim 1, further comprising determination permitting means for permitting determination by said determining means when said engine is started in the condition where said engine is cooled to a temperature substantially equal to an outside air temperature.

11. A failure detection apparatus according to claim 1, further comprising stoppage threshold value calculating means for calculating a stoppage threshold value according to an initial cooling water temperature detected at starting of said engine, the stoppage threshold value corresponding to a value of the determination threshold when said vehicle is stopped, wherein the determination threshold is calculated using the calculated stoppage threshold value.

12. A failure detection apparatus for a cooling system of an internal combustion engine, said cooling system having a radiator, a cooling water pipe for circulating a cooling water in said engine to said radiator, and a thermostat provided in said cooling water pipe for opening and closing said cooling water pipe, said failure detection apparatus detecting failure of said thermostat and comprising:

a vehicle speed sensor for detecting a vehicle speed of a vehicle driven by said engine;

one or more operating condition sensor for detecting an operating condition of said engine, said one or more operating condition sensor including cooling water temperature sensor for detecting a temperature of the cooling water;

an estimated cooling water temperature calculating module for calculating an estimated cooling water temperature of said engine according to said operating condition detected by said one or more operating condition sensor; and a determining module for comparing said estimated cooling water temperature and a determination threshold set according to said vehicle speed at the time said cooling water temperature detected by said cooling water temperature sensor has exceeded a predetermined water temperature, to thereby determine that said thermostat is normal.

13. A failure detection apparatus according to claim 12, wherein said determining module determines that said thermostat is normal when the estimated cooling water temperature is lower than or equal to the determination threshold.

14. A failure detection apparatus according to claim 12, wherein the determination threshold is set to a value decreasing with a decrease in the vehicle speed.

15. A failure detection apparatus according to claim 14, further comprising an average vehicle speed calculating module for calculating an average vehicle speed after completion of starting of said engine, wherein said determination threshold is set according to said average vehicle speed.

16. A failure detection apparatus according to claim 12, further comprising an average vehicle speed calculating module for calculating an average vehicle speed after completion of starting said engine, wherein said determining module determines that said thermostat is normal when the estimated cooling water temperature is lower than a predetermined estimated water temperature value that is higher than the predetermined water temperature, and the average vehicle speed is higher than or equal to a determination vehicle speed at the time the detected cooing water temperature has exceeded the predetermined water temperature.

17. A failure detection apparatus according to claim 16, wherein the determination vehicle speed is set according to an initial cooling water temperature at starting of said engine.

18. A failure detection apparatus according to claim 12, wherein said estimated cooling water temperature calculating module comprises a thermal load parameter calculating module for calculating a thermal load parameter indicating a degree of raising the cooling water temperature, wherein said estimated cooling water temperature calculating module calculates the estimated cooling water temperature according to the thermal load parameter and an initial cooling water temperature at starting of said engine.

19. A failure detection apparatus according to claim 18, wherein said thermal load parameter calculating module comprises a generated heat quantity calculating module for calculating a generated heat quantity integrated value indicating an integrated value of a heat quantity generated from said engine after starting of said engine and a cooling loss calculating module for calculating a cooling loss integrated value indicating an integrated value of a heat quantity lost by a heater in said vehicle and a heat quantity lost by a wind after starting of said engine, wherein said thermal load parameter calculating module calculates the thermal load parameter according to the generated heat quantity integrated value and the cooling loss integrated value.

20. A failure detection apparatus according to claim 19, wherein said generated heat quantity calculating module calculates said generated heat quantity integrated value according to an intake air amount per unit time of said engine, and said cooling loss calculating module calculates the cooling loss integrated value according to an estimated water temperature rise after starting of said engine and the vehicle speed.

21. A failure detection apparatus according to claim 12, further comprising a determination permitting module for permitting determination by said determining module when said engine is started in the condition where said engine is cooled to a temperature substantially equal to an outside air temperature.

22. A failure detection apparatus according to claim 12, further comprising stoppage threshold value calculating module for calculating a stoppage threshold value according to an initial cooling water temperature detected at starting of said engine, the stoppage threshold value corresponding to a value of the determination threshold when said vehicle is stopped, wherein the determination threshold is calculated using the calculated stoppage threshold value.

23. A failure detection method for a cooling system of an internal combustion engine, said cooling system having a radiator, a cooling water pipe for circulating a cooling water in said engine to said radiator, and a thermostat provided in said cooling water pipe for opening and closing said cooling water pipe, said failure detection method detecting failure of said thermostat and comprising the steps of:

a) detecting a vehicle speed of a vehicle driven by said engine;

b) detecting an operating condition of said engine, said operating condition including a temperature of the cooling water;

c) calculating an estimated cooling water temperature of said engine according to the detected operating condition; and d) comparing the estimated cooling water temperature and a determination threshold set according to the vehicle speed at the time the detected cooling water temperature has exceeded a predetermined water temperature, to thereby determine that said thermostat is normal.

24. A failure detection method according to claim 23, wherein said thermostat is determined to be normal when the estimated cooling water temperature is lower than or equal to the determination threshold.

25. A failure detection method according to claim 23, wherein the determination threshold is set to a value decreasing with a decrease in the vehicle speed.

26. A failure detection method according to claim 25, further comprising the step of calculating an average vehicle speed after completion of starting of said engine, wherein the determination threshold is set according to the average vehicle speed.

27. A failure detection method according to claim 23, further comprising the step of calculating an average vehicle speed after completion of starting said engine, wherein said thermostat is determined to be normal when the estimated cooling water temperature is lower than a predetermined estimated water temperature value that is higher than the predetermined water temperature, and the average vehicle speed is higher than or equal to a determination vehicle speed at the time the detected cooling water temperature has exceeded the predetermined water temperature.

28. A failure detection method according to claim 27, wherein the determination vehicle speed is set according to an initial cooling water temperature at starting of said engine.

29. A failure detection method according to claim 23, wherein the step c) of calculating the estimated cooling water temperature comprises the step of calculating a thermal load parameter indicating a degree of raising the cooling water temperature, wherein the estimated cooling water temperature is calculated according to the thermal load parameter and an initial cooling water temperature at starting of said engine.

30. A failure detection method according to claim 29, wherein the step of calculating the thermal load parameter further comprises the steps of calculating a generated heat quantity integrated value indicating an integrated value of a heat quantity generated from said engine after starting of said engine, and calculating a cooling loss integrated value indicating an integrated value of a heat quantity lost by a heater in said vehicle and a heat quantity lost by a wind after starting of said engine, wherein the thermal load parameter is calculated according to the generated heat quantity integrated value and the cooling loss integrated value.

31. A failure detection method according to claim 30, wherein said generated heat quantity integrated value is calculated according to an intake air amount per unit time of said engine, and the cooling loss integrated value is calculated according to an estimated water temperature rise after starting of said engine and the vehicle speed.

32. A failure detection method according to claim 23, further comprising the step of permitting execution of the step d) of comparing the estimated cooling water temperature and the determination threshold, when said engine is started in the condition where said engine is cooled to a temperature substantially equal to an outside air temperature.

33. A failure detection method according to claim 23, further comprising the step of calculating a stoppage threshold value according to an initial cooling water temperature detected at starting of said engine, the stoppage threshold value corresponding to a value of the determination threshold when said vehicle is stopped, wherein the determination threshold is calculated using the calculated stoppage threshold value.

* * * * *

UNITED STATES PATENT AND TRADEMARK OFFICE
CERTIFICATE OF CORRECTION

PATENT NO. : 6,615,647 B2  
DATED : September 9, 2000  
INVENTOR(S) : Manabu Niki Page 1 of 1

It is certified that error appears in the above-identified patent and that said Letters Patent is hereby corrected as shown below:

<u>Title page,</u>
Item [*] Notice, delete the phrase "by 0 days" and insert -- by 86 days --

Signed and Sealed this

Ninth Day of November, 2004

JON W. DUDAS
*Director of the United States Patent and Trademark Office*

UNITED STATES PATENT AND TRADEMARK OFFICE
CERTIFICATE OF CORRECTION

PATENT NO. : 6,615,647 B2
DATED : September 9, 2003
INVENTOR(S) : Niki

It is certified that error appears in the above-identified patent and that said Letters Patent is hereby corrected as shown below:

Column 5,
Line 10, replace "angle(at" with -- angle (at --;

Column 15,
Line 23, replace "cooing" with -- cooling --.

Signed and Sealed this

Third Day of May, 2005

JON W. DUDAS
*Director of the United States Patent and Trademark Office*